United States Patent [19]

Gronholz et al.

[11] Patent Number: 4,657,570
[45] Date of Patent: Apr. 14, 1987

[54] AIR FILTER DEVICE

[75] Inventors: Donald D. Gronholz, Bloomington; Kirk A. Schneider, Eden Prairie; James R. Scott, Chanhassen, all of Minn.

[73] Assignee: Donaldson Company, Inc., Minneapolis, Minn.

[21] Appl. No.: 714,040

[22] Filed: Mar. 20, 1985

[51] Int. Cl.$^4$ ............................................. B01D 46/10
[52] U.S. Cl. ................... 55/385 E; 55/501; 55/510; 55/511
[58] Field of Search ............ 55/159, 332, 333, 385 E, 55/497, 501, 510, 511, 514, DIG. 5

[56] References Cited

U.S. PATENT DOCUMENTS

| 3,502,530 | 3/1970 | Adams et al. | 55/511 X |
|---|---|---|---|
| 3,740,735 | 6/1973 | Gabor | 55/385 E X |
| 3,782,083 | 1/1974 | Rosenberg | 55/501 X |
| 3,803,810 | 4/1974 | Rosenberg | 55/159 |
| 3,932,153 | 1/1976 | Byrns | 55/511 |
| 4,238,207 | 12/1980 | Ruschke | 55/159 |
| 4,308,041 | 12/1981 | Ellis et al. | 55/385 E X |
| 4,341,538 | 7/1982 | Vadnay et al. | 55/159 |
| 4,404,006 | 9/1983 | Williams et al. | 55/DIG. 5 |
| 4,410,341 | 10/1983 | Edwards et al. | 55/385 E X |
| 4,552,574 | 11/1985 | Hotta | 55/501 |

FOREIGN PATENT DOCUMENTS 2809321 9/1979 Fed. Rep. of Germany ........ 55/501

Primary Examiner—Robert Spitzer
Attorney, Agent, or Firm—Merchant, Gould, Smith, Edell, Welter & Schmidt

[57] ABSTRACT

The present invention is directed to a device (50) for providing filtration of air. The device includes a body (70) and a cover (72) with each having endless mating structure (76) and (78) which may be welded together thereby mechanically pinching a flat sheet filter media (74) and holding it in place. The cut edge of the filter media (74) is encapsulated. The filter media (74) is held outwardly from bottom (92) of body (70) by gussets (90) to provide sufficient area for air to pass through. Inlet openings (110) are provided between top (94) and endless mating structure (78) in a fashion which allows top (94) to be attached to a flat wall of a sealed housing of a type used for disk drive systems.

2 Claims, 12 Drawing Figures

FIG. 7
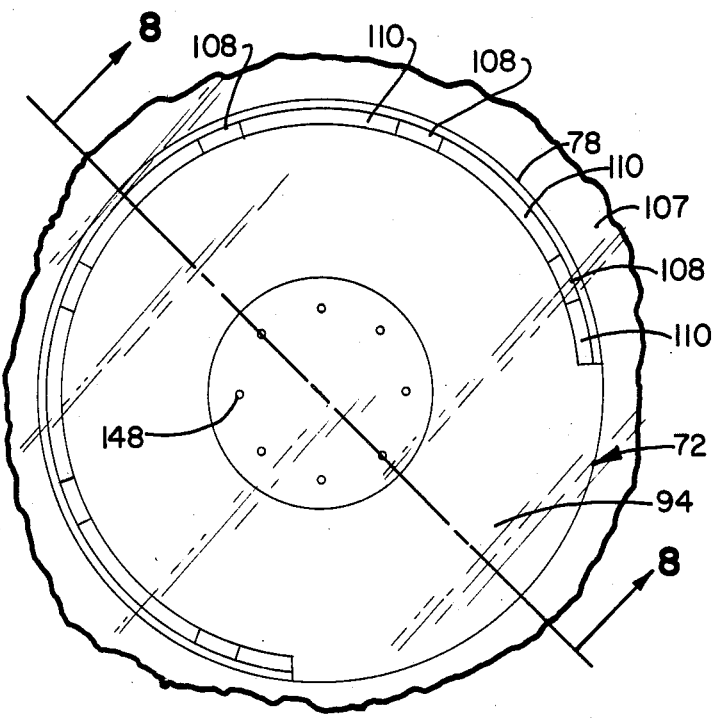
FIG. 11
FIG. 12
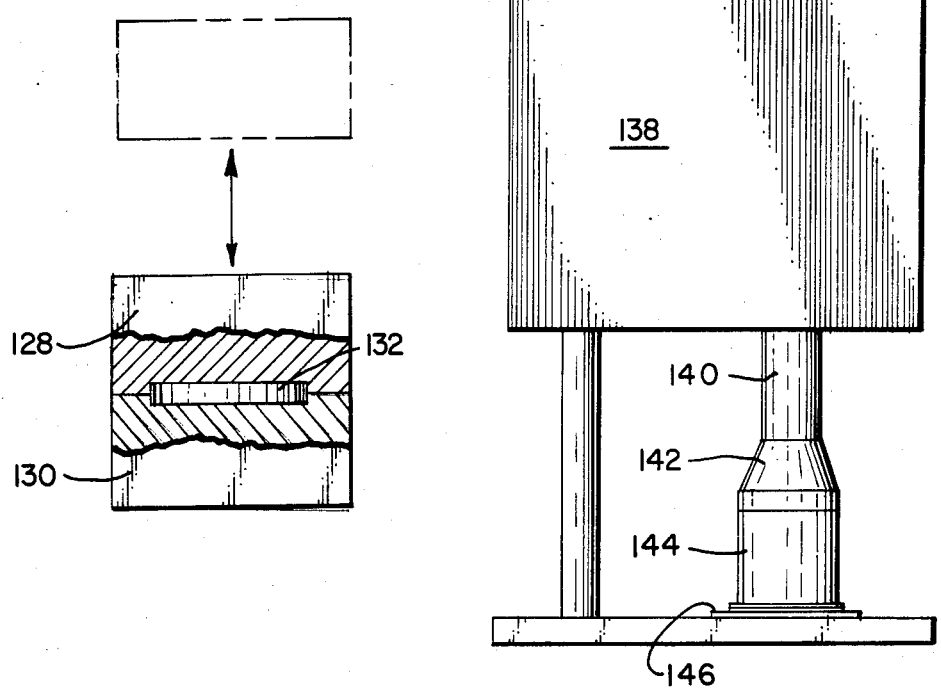

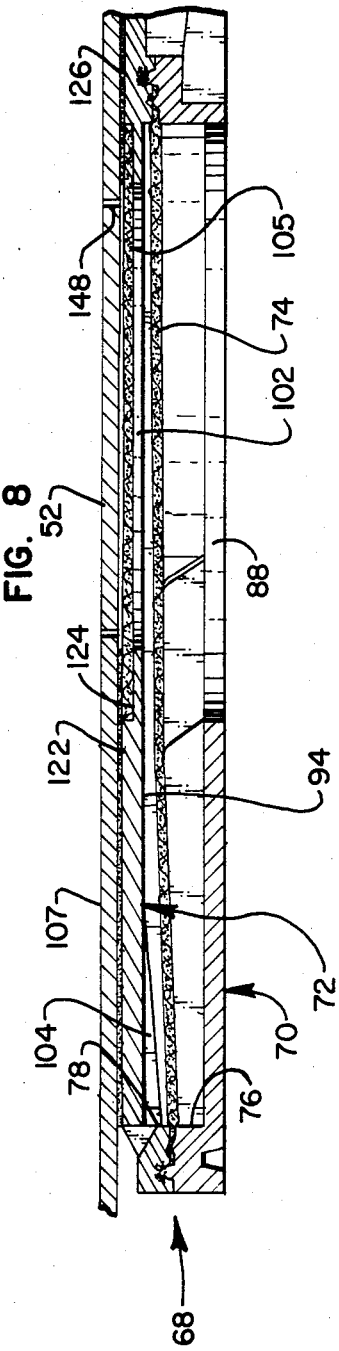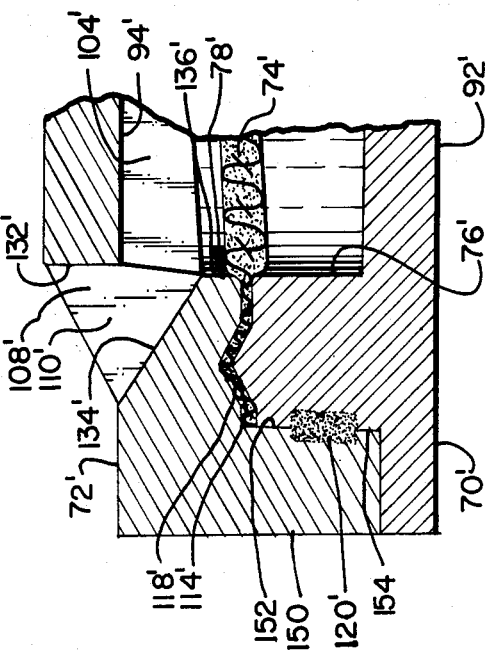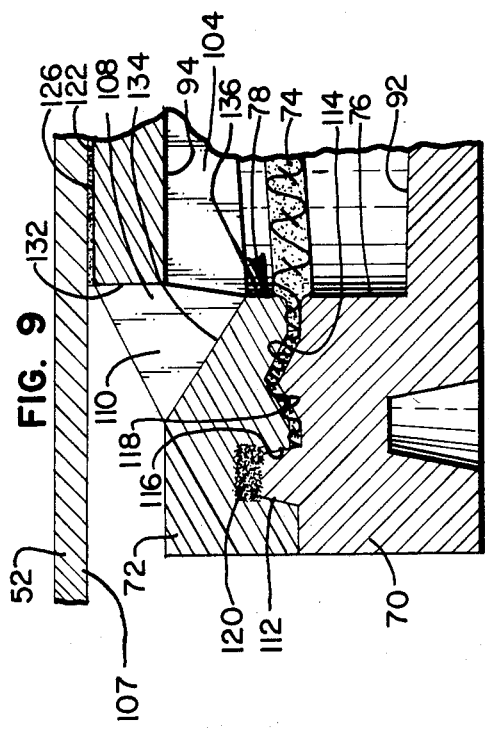

AIR FILTER DEVICE

FIELD OF THE INVENTION

The present invention relates to the general field of air filter devices and, more particularly, to flat sheet filter devices for sealed magnetic disk drive systems.

BACKGROUND OF THE INVENTION

The demand for more effective filtration of air in sealed disk drive devices continues to increase as the disk drive industry moves toward higher performance, higher capacity and smaller sealed drives. Drive cleanliness and heat dissipation are extremely important if not critical factors. With respect to the cleanliness factor, sealed disk drive systems presently use a breather/pressure equalizing filter and a recirculating filter. Generally, the breather filter is a flat sheet, high efficiency media filter, while the recirculating filter is a lower efficiency, pleated unit. The present invention is directed to a flat sheet media filter device for particularly the recirculating filter, and also to a combination of flat sheet media for both filters in the same housing.

A typical sealed disk drive system is shown in FIGS. 1 and 2 of the drawings. Housing 20 contains platters 21 on spindle 22. Actuator arms 23 move read/write heads 24 as required. Since the distance between the platters and the read/write heads is crucial, the presence of small contaminating particles can affect the system. As the platters spin, centrifugal force causes a circulation of air in housing 20. A filter 25 is located to receive the moving air and clean it. In addition, a breather filter 27 cleans make-up air. During operation, regions of low pressure are created, particularly in the area of the spindle, and make up air is needed to equalize pressure relative to ambient. Also, the bearing 26 which journals spindle 22 is often sensitive to pressure differentials, and, care must be taken to maintain as near an equal pressure to ambient within housing 20 as possible. In addition, as temperature rises in housing 20 after a period of continuous operation, pressure also rises and it may be necessary to release air from within housing 24. For these reasons, breather filter 27 is commonly installed in a wall of housing 20. Although breather filter 27 is known to be made from flat sheet filter media, recirculating filter 25 is commonly a pleated unit. In the interest of reducing space as units become smaller, the present invention is directed to an air filter device of a flat sheet media type for replacing the pleated recirculating filter of the art.

Two known techniques for assembling flat sheet filter media by means of ultrasonic welding are shown in FIGS. 3 and 4. In FIG. 3, the filter media 28 is ultrasonically welded at ring 29 to plastic frame 30. A concern is that fraying at the cut edge of the filter media over time is subject to releasing particles and strands of material into the housing environment. The technique of FIG. 3 uses an adhesive ring 31 to contain cut edge 32 of media 28 between weld ring 29 and frame 30.

In FIG. 4, filter media 33 is mechanically pinched between structures 35 and 36 of frame halves 37 and 38 to contain the cut edge of media 33 between the pinching structures and ring 39. Frame halves 37 and 38 are ultrasonically welded together at ring 39.

The problem addressed by the present invention then is to provide a housing for flat sheet filter media which receives recirculating air from within a sealed housing and directs that air through the flat sheet filter media. Sufficient media area must be available to allow a sufficient volume of air to pass through the media without developing an unnecessary resistance to the flow of air. Also, the cut edge of the filter media must be encapsulated.

SUMMARY OF THE INVENTION

The present invention includes flat sheet filter media held by a body member and a cover member. The body member has a bottom with an outlet opening therein and a first endless mating structure which surrounds the outlet opening. The cover member has a top with a second endless mating structure extending therefrom. The cover member also includes mechanism for receiving air between the flat upper surface of the top and the second endless mating structure. The filter device further includes a mechanism for sealing along a continuous endless path the first and second endless mating structures. The sealed structure holds the filter media and encapsulates the cut edge of the filter media.

The filter device of the present invention advantageously includes the flat upper surface of the top of the cover which is available for adhesive attachment to, for example, the housing of a disk drive system. At the same time, the filter device includes inlet openings for receiving air in the region between the flat upper surface and the second endless mating structure. The air passes through the inlet openings and the flat sheet filter media to the outlet opening.

A further feature of both the body member and the cover member are gussets located along radial lines of a circular such filter device. Gussets attached to the body member support the filter media away from the bottom of the body member to position the media to provide additional media area through which air may pass. Gussets attached to the cover member provide structure to prevent the top of the cover member from warping thereby minimizing the probability of a break in seal integrity between the top of the cover member and the sealed housing. Such seal integrity is particularly important in the case where a breather/pressure equalizing filter is attached to the top of the cover member, so that all incoming air must pass through the breather filter and not a leakage path.

The present filter device is also advantageous because of the relatively simple procedure which may be used to make the device. Both the body and cover members may be injection molded using a simple straight pull tool with half the tool moving unidirectionally against and away from the other half of the tool which is ordinarily stationary. Sidewardly moving tool parts or removable parts are not needed. Furthermore, the filter device body and cover are ultrasonically welded together using a welding unit which also moves unidirectionally against and away from a stationary nest holding the filter device parts in proper arrangement. As a result of being able to move both mold and weld tools in only a single direction, both tooling and actual manufacturing are relatively inexpensive.

BRIEF DESCRIPTION OF THE DRAWINGS

FIG. 7 is a plan view of the device of FIG. 6;

FIG. 8 is a cross-sectional view taken along lines 8—8 of FIG. 7;

FIG. 9 is an enlarged, cross-sectional view of an outer edge region of FIG. 8;

FIG. 10 is an alternate embodiment outer edge region similar to FIG. 9;

FIG. 11 is an illustration in partial cross section of tool members for injection molding each of the body and the cover of a device in accordance with the method of the present invention; and FIG. 12 is an illustration in partial cross section of a tool for ultrasonically welding the cover and the body in a way to pinch and hold the flat sheet filter media in accordance with the method of the present invention.

DETAILED DESCRIPTION OF THE PREFERRED EMBODIMENT

Figure 1:
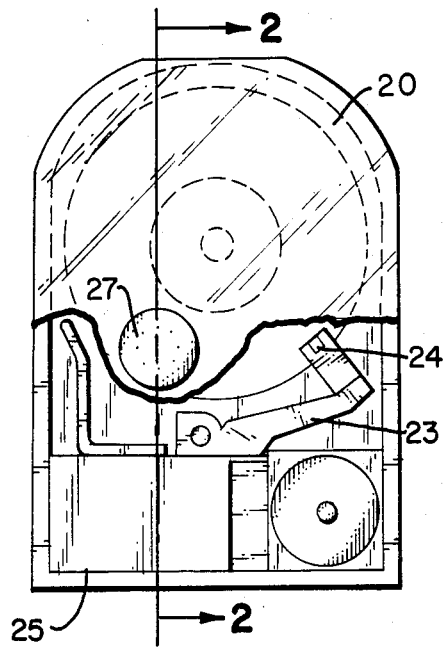
FIG. 1 is an illustration in plan view of a typical prior art sealed disk drive system.
Figure 2:
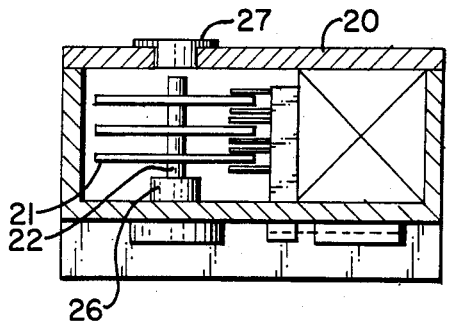
FIG. 2 is a view in cross section taken along line 2—2 of FIG. 1.
Figure 3:
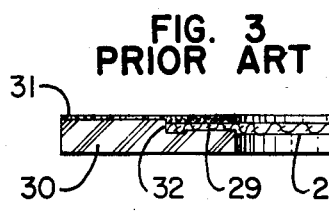
FIG. 3 is a cross-sectional view of a prior art method for attaching a flat sheet filter media to a frame.
Figure 4:
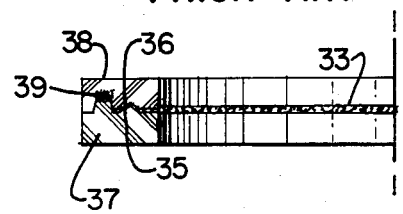
FIG. 4 is a cross-sectional view of a priot art method for attaching a flat sheet filter media between frame halves.
Figure 5:
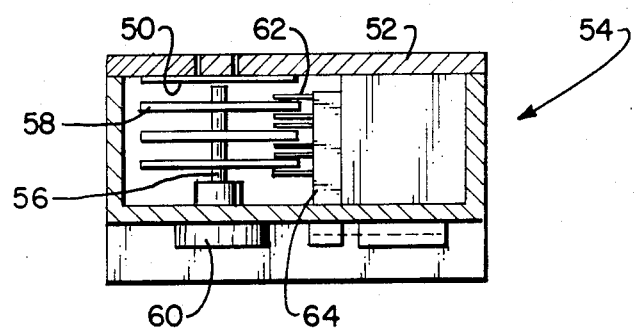
FIG. 5 is an illustration in cross section similar to FIG. 2, except showing a filter device in accordance with the present invention.

Referring now to the drawings wherein like reference numerals designate identical or corresponding parts throughout the several views, and more particularly to FIG. 5, an air filter device in accordance with the present invention is designated generally by the numeral 50 as attached to a housing 52 of a sealed disk drive system designated generally by the numeral 54. A spindle 56 holds one or more magnetic disks 58 which are rotated by a drive mechanism 60. Read and write heads 62 function in conjunction with control mechanism 64.

Figure 6:
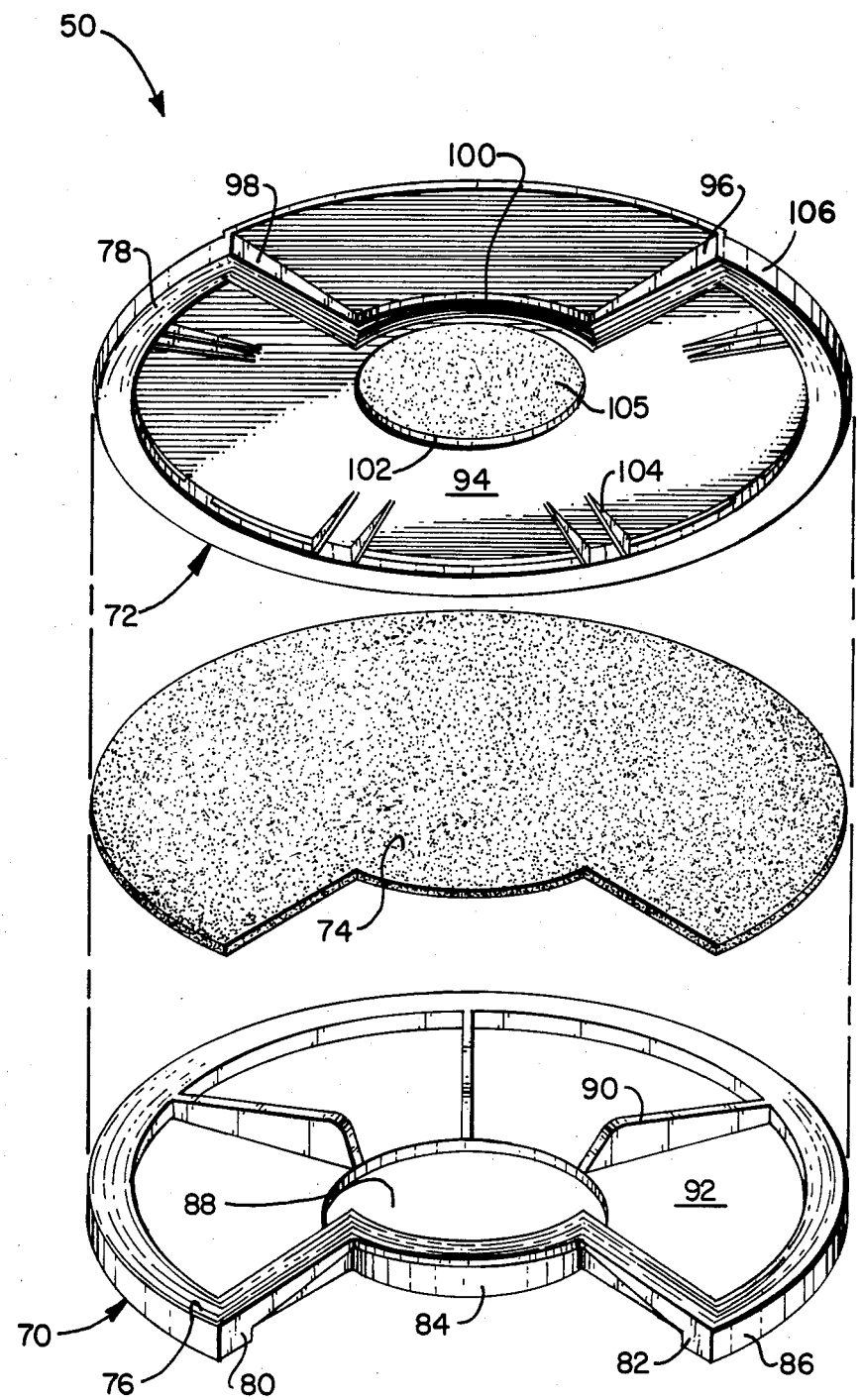
FIG. 6 is an exploded perspective of the elements of a filter device in accordance with the present invention.

As shown in FIG. 6, filter device 50 includes a housing 68 (see FIG. 8) which includes a body 70 and a cover 72. Flat sheet filter media 74 is held between first endless mating structure 76 on body 70 and second endless mating structure 78 on cover 72. Body 70 and cover 72 are preferably, although not necessarily, circular, as shown in the plan view of FIG. 5, except body 70 has a cutout portion between walls 80 and 82 which lie along radial lines extending from the center of body 70. The cutout portion extends inwardly to wall 84 which lies along an inner circumferential line at a diameter less than the diameter of the outer wall 86 of body 70. An outlet opening 88 is aligned on the axis of body 70 and has a smaller diameter than first endless mating structure 76 of which wall 84 is a part. A plurality of spaced-apart gussets 90 extend preferably along radial lines between first endless mating structure 76 and opening 88. Gussets 90 are attached to bottom 92 and have a ramp shape which rises as the gusset proceeds inwardly from first endless mating structure 76. Filter media 74 is supported on gussets 90 so that air may easily flow through media 74 along bottom 92 to opening 88.

Cover 72 is also preferably circular as shown and has second mating structure 78 having the same general shape as first endless mating structure 76. That is, second endless mating structure 78 extends downwardly from top 94 around the periphery of top 94 to walls 96 and 98 which are generally aligned with walls 80 and 82 of body 70. Similarly, a wall 100 extends between walls 96 and 98 along a circumference generally similar to that of wall 84. Top 94 extends not only in the obtuse angular space between walls 96 and 98, but also in the acute angular space therebetween. A second opening 102 is circular and aligned on the axis of cover 72 and has a diameter less than the diameter of wall 100. A plurality of gussets 104 extend inwardly from second endless structure 78, but in the preferred embodiment do not extend to second opening 102. Gussets 104 are attached to top 94 and have a ramp shape which decreases toward top 94 as the gussets extend from second endless mating structure 78 toward second opening 102. Flat sheet filter media 105 for the breather or pressure equalizing filter mechanism covers second opening 102.

As shown in the plan view of FIG. 5, beneath a cover 107 for housing 52, top 94 of cover 72, except in the acute angular wedge portion between walls 96 and 98, has a smaller diameter than the outer wall of second endless mating structure 78. In the acute angular portion between walls 96 and 98, top 94 is illustrated to extend to the diameter of the outer wall 106 of second endless mating structure 78. In the obtuse angular region between walls 96 and 98, a plurality of bridge members 108 connect top 94 with second endless mating structure 78. In the spaces between ridge members 108, there is a plurality of openings 110 which allow recirculating air to pass therethrough.

The structures of body 70 and cover 72 in the region of first and second endless mating structures 76 and 78 are shown in FIGS. 8 and 9. In particular, first endless mating structure 76 of body 70 along the top end shows in cross section a first generally rectangular protrusion 112 and a second generally triangular protrusion 114. In mating fashion, second endless mating structure 78 of cover 72 is formed to include along its bottom side as shown in cross section a first mating groove 116 for receiving protrusion 112 and a second mating groove 118 for receiving protrusion 114. Body 70 and cover 72 are attached together with an ultrasonic weld in the region 120 shown by the stippling at the top of protrusion 112 and the bottom of groove 116. First and second protrusions 112 and 114 and first and second grooves 116 and 118 are formed relative to one another so that when first protrusion 112 fits snugly in first groove 116 and is welded thereto at region 120, second protrusion 114 is spaced slightly from the wall of second groove 118 so as to leave a small amount of space for receiving the peripheral portion of filter media 74. The separation between protrusion 114 and groove 118, however, is small in order that the edge of filter media 74 is pinched therebetween and held firmly as a result thereof. In this way, the cut edge of side edge of filter media 74 is encapsulated or confined between mating protrusion 114 with groove 118 and mating protrusion 112 with groove 116 to prevent any particles from fraying or breaking away from the cut side edge of filter media 74 and falling into the filtered environment.

As an alternative to creating weld 120 between protrusion 112 and cavity 116, a shear weld 120' as shown in FIG. 10 may be formed. In that case, cover 72' includes a flange 150 which fits about endless mating structure 76' rising from bottom 92'. Protrusion 114' is at the top of mating structure 76', while weld 120' is along a substantially vertical outer wall 154. Weld 120' is formed in a region where inner wall 152 of flange 150 and outer wall 154 of mating structure 76' contact one another. Shear weld 120' may be made with apparatus 138 as shown in FIG. 12 and discussed hereinafter. In this configuration of body 70' and cover 72', filter media 74' is pinched between a protrusion 114 and a mating groove 118' in a fashion similar to the embodiment of FIG. 9.

Filter device 50 is constructed to have a housing 68 for holding flat sheet filter media 74 in such a way that the cut edge of media 74 is encapsulated as indicated. Openings 110 in cover 72 of housing 68 provide for the passage or air into housing 68 on the top side of media 74 so that the air may flow through media 74 and pass from housing 68 through opening 88. In many applications, and in particular in a sealed disk drive system, it is desirable to adhesively attach the upper side 122 of top 94 to a flat surface. In such an instance, openings 110 must be formed so that air passes between second endless mating structure 78 and top 94 as described hereinbefore. A further reason for attaching top 94 to a flat surface is that it is generally desirable to provide a mechanism for equalizing pressure between the interior of a housing, such as sealed housing 52 and ambient pressure. In this case, a breather filter is provided so that when air comes into the housing to equalize pressure, the air is first filtered. Breather filter 105 is shown in FIG. 8. A recess 124 is provided surrounding opening 102 so that filter media 105 does not protrude above surface 122. Filter media 105 is welded to cover 72. Double side adhesive material 126 is attached to upper surface 122 of cover 72 and extends inwardly sufficiently far to cover and encapsulate the cut edge of filter media 105 between seal material 126 and the bottom of recess 124.

To preserve the integrity of the seal made by material 126 between cover 72 and wall 107, it is necessary for upper surface 122 to be flat and to remain free of warpage. This requirement dictates that openings 110 be located between top 94 and second endless mating structure 78.

In making filter device 50, it is desirable to form body 70 and cover 72 from a plastic material using known injection molding techniques. In this regard, it is further desirable to form body 70 and cover 72 in a way which results in inexpensive tooling and a quick, uncomplicated procedure. As shown in FIG. 11, the present body 70 and cover 72 may be molded using tools which move along a single line toward and away from one another. That is, a movable tool portion 128 moves toward a stationary tool portion 130 to form an appropriately shaped cavity 132 between them for receiving injected plastic. When appropriate, the movable tool portion 128 is then moved away from the stationary tool portion 130 and ejection pins loosen either body 70 or cover 72 from the appropriate tool portion. Body 70 and cover 72 may be formed in this way since neither has structure which overlays other structure. With respect to cover 72, for example, as shown in FIG. 9, openings 110 have inner and outer walls 132 and 134 which is formed by tool structure which moves along a vertical line into and out of contact with the walls. Wall 132 is vertical or slightly slanted from the bottom to the top toward the center of upper surface 122. Wall 134 may be inclined upwardly from inside to outside as shown or downwardly or may be horizontal. Wall 134, however, must be spaced outwardly from wall 132 so that inner wall 136 of second endless mating structure 78 is outwardly from wall 132. The inside end of wall 134 and the lower end of wall 132 must be spaced apart so that a passage 110 is formed. Similarly, all the other structures of body 70 and cover 72 have vertical or appropriately slanted sides with respect to bottom 92 and top 94 so that it may be formed by tooling which moves along a single directional line.

Thus, the first steps in making filter device 50 are to mold body member 70 and cover member 72. The next step is to cut flat sheet filter media 74 to have a perimeter shape roughly similar to first and second mating structure 76 and 78. Body and cover members 70 and 72 are next arranged to receive filter media 74 between protrusion 114 and cavity 118 of first and second mating structures 76 and 78. Then, body 70 and cover 72 are welded together ultrasonically at region 120. The present structure of body 70 and cover 72 allows for the use of welding apparatus wherein the movable portion of the apparatus moves toward and away along a single directional line from the stationary part of the apparatus. More particularly, as shown in FIG. 12, welding machine 138 includes a transducer 140 connected to an amplifier 142 which in turn is attached to a horn 144. A nesting tool 146 is held stationary and transducer 140, amplifier 142, and horn 144 are moved toward and away from nesting tool 146. With respect to device 50, the arranged parts as indicated above are placed in nesting tool 146. Horn 144 is moved downwardly onto preferably the flat outer surface of the bottom of body 70 to make firm contact in the region of bottom 92 opposite mating structure 76. Nesting tool 146 makes firm contact with cover 72 especially in the region of mating structure 78 on the side opposite grooves 116 and 118. As transducer 140 is functioned, body 70 and cover 72 are fused together at region 120 in the manner known with respect to the ultrasonic welding technique. Alternatively, the weld may be accomplished as a shear weld in region 120'.

Breather filter 105 is installed by arranging filter 105 in recess 124 and welding media 105 thereto with apparatus 138 using appropriate nesting and horn tools. Double sided adhesive material 126 is then laid in place. In the usual case, a backing paper would remain on the exposed side of adhesive material 126 until device 50 were attached to a housing like 52 of FIG. 5.

In use, any backing paper is removed from adhesive material 126 and device 50 is located relative to one or more openings 148 (see FIG. 8). Openings 148 and the opening 102 covered by filter media 105 must be aligned. Outside air may then pass through openings 148 and 102, both filter medias 105 and 74 before exiting from outlet opening 88. In like fashion, air may pass from the interior of the sealed housing through the filter media 105 and openings 102 and 148 to ambient.

As an air flow pattern is set up by the rotating platters or disks 58 in housing 52, air enters inlet openings 110 and passes over the top of filter media 74. If there is a slight vacuum beneath device 50, the air will pass through filter media 74 and exit from outlet opening 88. If there is a slight pressure in housing 52, then air will flow through filter media 105 and out openings 102 and 148.

As pointed out hereinbefore, filter media 74 is held above bottom 92 by gussets 90 so that sufficient area is available for the air to pass through media 74. Gussets 104 on cover 72 help to make cover 72 a rigid structure so that top 94 does not warp, flex or bend thereby cracking the seal between material 126 and wall 107 or top 94 to create a leakage path.

Thus, device 50 provides structure for a flat sheet filter media recirculating filter device. Furthermore, the structure is such that it may be attached to a flat wall so that it may be used as a recirculating filter by itself or, when an appropriate flat sheet second filter is attached, it becomes a combination device to provide both a breathing/pressure equalizing feature and a recirculating feature.

In either case, filter device 50 has been hereinbefore described in detail with respect to a preferred embodiment. Within the clear intent of the invention, however, it is understood that modifications and equivalencies are possible. Consequently, it is understood that changes made, especially in matters of shape, size and arrangement, to the full extent extended by the general meaning of the terms in which the appended claims are expressed, are within the principle of the invention.

What is claimed is:

1. A filter device for a sealed disk drive system, said system including a magnetic disk and a rotatable spindle for receiving the disk, said spindle having a free end, said system further including a housing having a wall spaced apart from the free end of said spindle, said wall having a first opening therein, said wall having a flat interior surface, said device comprising:

a recirculating filter media with a cut edge;

a body member having a bottom with an outlet opening therein and first gusset members rising above said bottom for supporting said recirculating filter media spaced outwardly from said outlet opening, said body member further having a first endless mating structure;

a cover member having a top with a flat upper surface and a second opening therein, said cover member further having second gusset members extending beneath said top to aid in maintaining upper surface flatness, said cover member also further having a second endless mating structure extending beneath said top to mate with said first endless mating structure of said body member, said cover member still also having inlet openings between said top and said second endless mating structure;

first means for sealing said first and second mating structures together;

means for holding said recirculating filter media such that air flowing through said inlet openings must go through said recirculating filter media to reach said outlet opening;

means for encapsulating the cut edge of said recirculating filter media;

a breather filter media;

second means for sealing said breather filter media to said cover member so that said breather filter media extends across said second opening; and third means for sealing the flat upper surface of said cover to the flat interior surface of said housing so that air may pass through said first and second openings and said breather filter media;

whereby air enters and exits said sealed disk drive system through said first and second openings and said breather filter media and recirculates within said housing as a result of said rotating disk to pass through said inlet openings, said recirculating filter media and said outlet opening.

2. A filter device in accordance with claim 1 wherein said filter sealing means includes a continuous ultrasonic weld and said encapsulating means includes an endless protrusion extending from one of said first and second endless mating structures and a mating groove for receiving said protrusion in the other of said first and second mating structures, said first filter media being pinched between said protrusion and said groove.

* * * * *